United States Patent [19]

Hamm

[11] Patent Number: 4,609,901

[45] Date of Patent: Sep. 2, 1986

[54] TRANSFORMER CLAMP-DOWN BRACKET

[76] Inventor: Joseph M. Hamm, 24901 W. North Rd., Lake Villa, Ill. 60046

[21] Appl. No.: 615,363

[22] Filed: May 30, 1984

[51] Int. Cl.⁴ ........................ H01F 15/02; F16M 5/00

[52] U.S. Cl. ........................................ 336/65; 336/67; 248/679

[58] Field of Search ........................... 336/65, 67, 100; 248/346, 637, 678, 679; 52/27, 294, 295; 174/37, 38; 361/333, 369, 370, 427

[56] References Cited

U.S. PATENT DOCUMENTS

| | | | |
|---|---|---|---|
| 3,066,367 | 12/1962 | Garman | 361/427 |
| 3,333,799 | 8/1967 | Peterson | 248/674 |
| 3,841,032 | 10/1974 | Grannis, III | 174/38 X |
| 4,097,012 | 6/1978 | McIntyre | 248/674 |
| 4,129,896 | 12/1978 | Young | 361/369 X |

*Primary Examiner*—Arthur T. Grimley
*Assistant Examiner*—C. Romano
*Attorney, Agent, or Firm*—Rolland R. Hackbart

[57] ABSTRACT

A clamp-down bracket secures a C-shaped housing of a transformer to a concrete foundation. The bracket includes a C-shaped first portion for engaging the side of an opening in the foundation and a second portion coupled to the first portion for engaging the C-shaped housing. The bracket may further include a bolt that is inserted into a threaded hole in the C-shaped portion of the bracket for forcing the second portion of the bracket to engage the C-shaped housing. One or more brackets can be used to secure the C-shaped housing to the foundation.

10 Claims, 2 Drawing Figures

TRANSFORMER CLAMP-DOWN BRACKET

BACKGROUND OF THE INVENTION

1. Field of the Invention

The present invention relates generally to mounting apparatus for electric transformers, and more particularly to an improved clamp-down bracket for securing a transformer to a concrete foundation.

2. Description of the Prior Art

Prior art mounting apparatus for electrical devices is exemplified by the mounting apparatus shown and described in U.S. Pat. Nos. 3,312,920, 3,713,620, 3,841,032, 4,023,755 and 4,212,446. Patent numbers 4,212,446 and 4,023,755 describe improved transformer mounting pads which can be used in place of conventional concrete pads. U.S. Pat. No. 3,841,032 describes a way of anchoring a transformer pad by means of screw anchors embedded in the ground. Also shown and described are hold-down clips which are bolted across the corner of the cableway in the pad in order to secure the transformer to the pad. All of the transformer mounting apparatus described in these patents require expensive mounting pads instead of the conventional concrete pad. Although concrete pads are less expensive, hold-down clips bolted across the corners of the cableway do not adequately secure the transformer to the concrete pad.

OBJECTS AND SUMMARY OF THE INVENTION

Accordingly, it is an object of the present invention to provide an improved clamp-down bracket for securing a transformer to a concrete pad.

It is another object of the present invention to provide an improved clamp-down bracket assembly for securing and positioning a transformer to the cableway in a concrete pad.

Briefly described, the present invention encompasses a clamp-down bracket for securing the C-shaped housing of a transformer to an opening in a foundation. The transformer is further coupled to underground power cables by way of the opening in the foundation. The unique bracket comprises a C-shaped first portion for engaging the side of the opening in the foundation and a second portion coupled to the first portion for engaging the C-shaped housing. The second portion can be forced against the C-shaped housing by inserting a bolt in a threaded hole in the C-shaped first portion of the bracket. Two or more brackets can be attached to the foundation and transformer housing at different locations on the opening in the foundation. Also, cross pieces can be attached to oppositely spaced brackets for rigidly holding the brackets in place.

DETAILED DESCRIPTION OF THE PREFERRED EMBODIMENT

Figure 1:
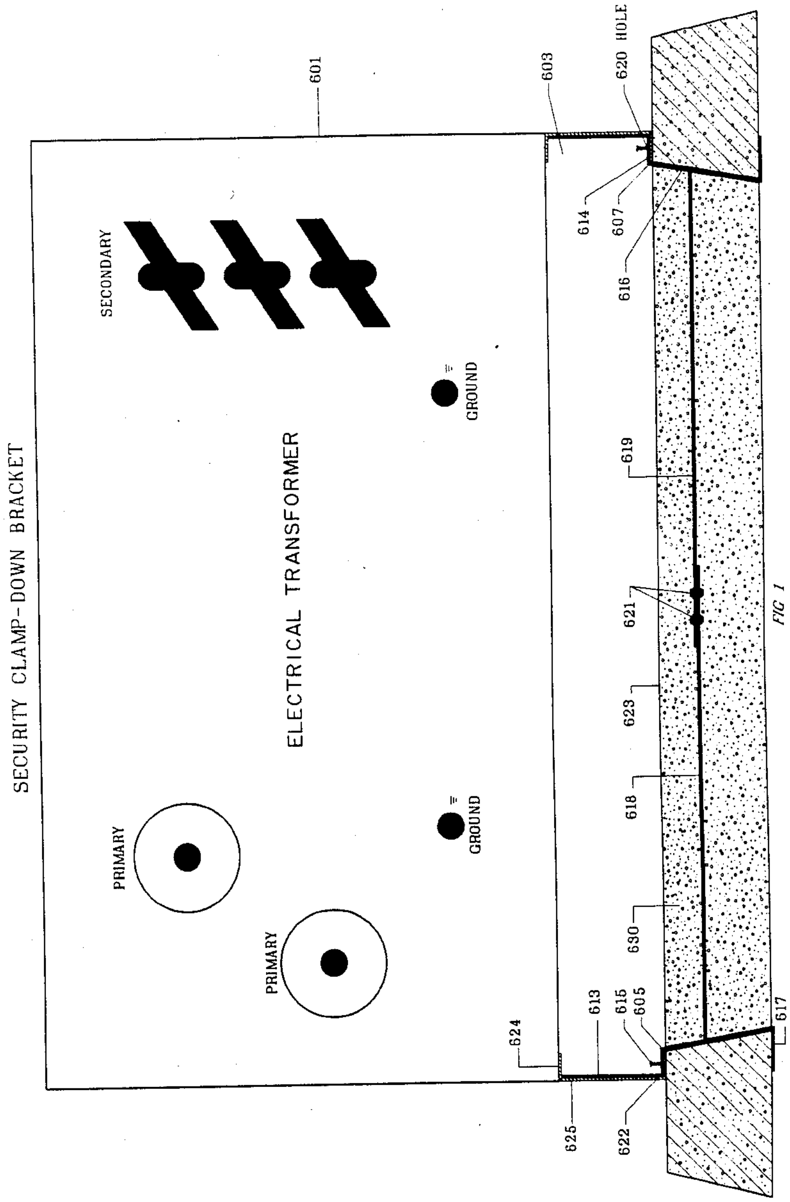
FIG. 1 is a cross-sectional view of a transformer, its C-shaped housing and a concrete foundation secured by means of two clamp-down brackets embodying the present invention.

In FIG. 1, there is illustrated an apparatus for mounting a transformer and its C-shaped housing to a concrete foundation or pad. Transformer 601 has two primary terminals, a secondary terminal and two ground terminals which are coupled to underground cables by way of an opening 630 in foundation 623. Transformer 601 is attached to C-shaped housing 603 which is substantially the same width as the opening in foundation 623. The size of the C-shaped housing 603 and opening 630 in the foundation 623 will vary depending upon the manufacturer.

According to the present invention, brackets 605 and 607 are slipped over the corresponding sides of the opening in foundation 623 for securing the transformer housing 603 to foundation 623. In particular, the C-shaped portion of bracket 605 engages the side of the opening 630 in foundation 623, end 617 inserting between the bottom of foundation 623 and the earth thereunder. The C-shaped portion of bracket 605 also covers the bottom edge 622 of housing 603. A second portion 613 of bracket 605 engages the side edge 625 of housing 603. The transformer 601 and housing 603 can be secured to foundation 623 by one or more brackets 605 and 607.

According to another feature of the present invention, brackets 605 and 607 may include a bolt 615 that inserts into a threaded hole 620 in the C-shaped portion of the brackets for forcing the second portion 613 of the brackets against the top edge 624 of the housing 603. The use of bolts 615 more rigidly secures brackets 605 and 607 to transformer housing 603. However, it should be understood that bolts 615 need not be used in practicing my invention.

According to yet a further feature of my invention, brackets 605 and 607 can be more rigidly held in position by means of cross pieces 618 and 619. Cross pieces may be welded or otherwise attached to the C-shaped portions of brackets 605 and 607. The opposite ends of cross pieces 618 and 619 are slotted to allow horizontal movement therebetween. The slotted ends are held together by means of bolts 621. The use of cross pieces 618 and 619 prevents transformer 601 from slipping sideways on foundation 623. However, it should be understood that cross pieces 618 and 619 need not be used in practicing my invention.

Figure 2:
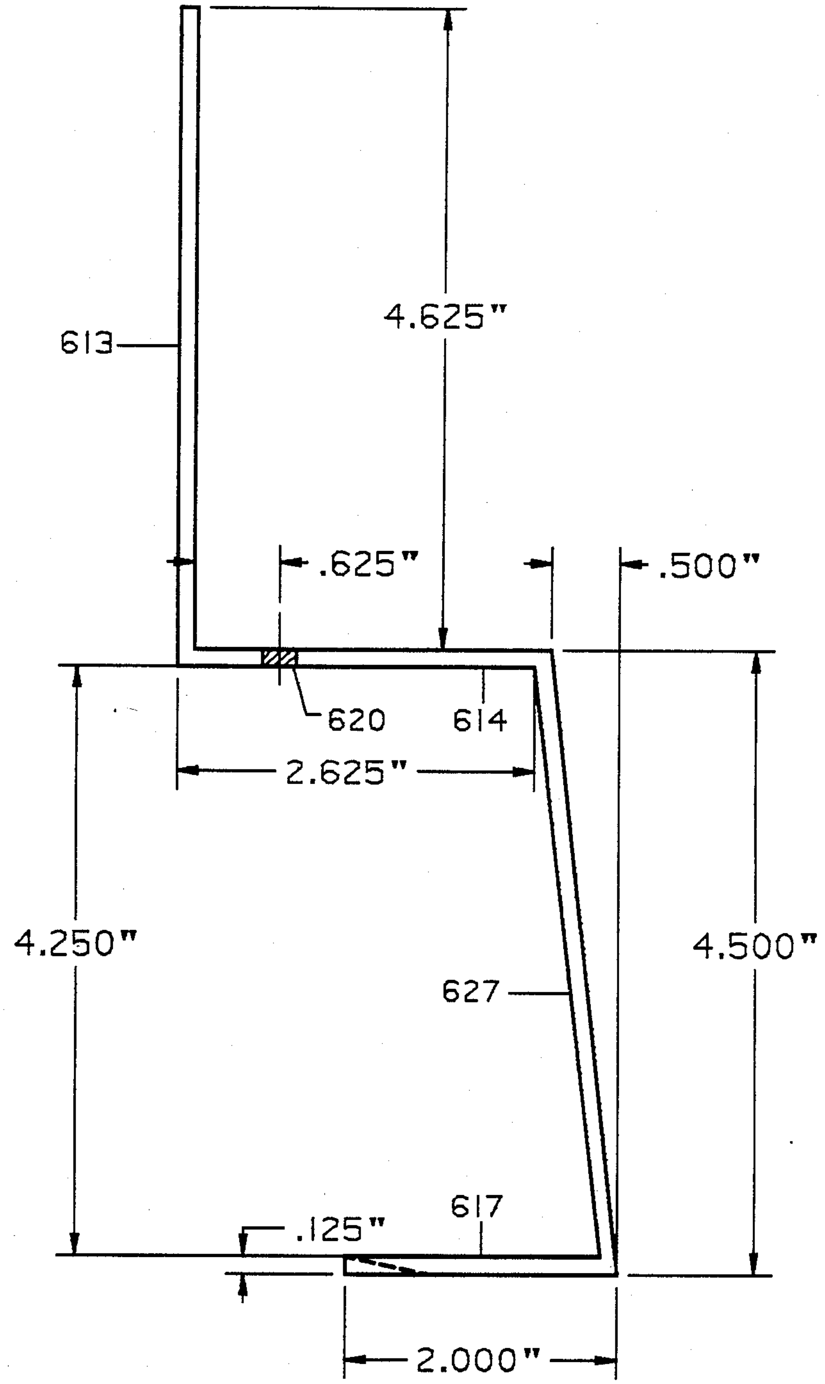
FIG. 2 is a cross-sectional view of a clamp-down bracket embodying the present invention.

Referring now to FIG. 2, there is illustrated a cross sectional view of brackets 605 and 607 in FIG. 1. C-shaped portion 614, 627 and 617 may be shaped to fit the side of the opening 630 in foundation 623. End 617 of brackets 605 and 607 may have a relatively sharp point to ease insertion under foundation 623 (see dotted lines on end 617). Hole 620 is preferably threaded for accepting bolt 615. As bolt 615 is tightened, second portion 613 of brackets 605 and 607 is forced against top edge 624 of housing 603. The typical dimensions in inches are also shown in FIG. 2 for brackets 605 and 607.

In summary, an improved clamp-down bracket for securing a transformer to a foundation has been described. The unique bracket can be easily and quickly installed and further provides for a rigid installation. My inventive bracket can be easily adapted to fit many different sizes of transformers and foundations. My bracket can be used in any suitable application where an inexpensive and secure mounting assembly is required.

I claim:

1. Apparatus for mounting a transformer to a foundation, said transformer further being coupled to underground power cables, said apparatus comprising:

C-shaped housing means for mounting the transformer;

said foundation having an opening for the power cables, said C-shaped housing means and transformer being disposed on said foundation; and bracket means having a C-shaped portion adapted to engage the side of the opening in the foundation and further having another portion engaging the C-shaped housing means.

2. The transformer mounting apparatus according to claim 1, further including a second bracket means for engaging the side of the opening in the foundation opposite said bracket means.

3. The transformer mounting apparatus according to claim 2, further including means for coupling said bracket means to said second bracket means, wherein said coupling means maintain said bracket means and said second bracket means substantially opposite to one another.

4. The transformer mounting apparatus according to claim 1, further including at least second and third bracket means for engaging the side of the opening in the foundation at pre-selected positions on said opening.

5. The transformer mounting apparatus according to claim 1, further including bolt means adapted to be inserted into a threaded hole in the C-shaped portion of the bracket means for forcing said another portion of the bracket means to engage the C-shaped housing means.

6. A bracket for securing a C-shaped housing to a foundation, said C-shaped housing having a transformer mounted thereon and coupled to underground power cables by way of an opening in the foundation, said bracket comprising:

a first C-shaped portion for engaging the side of the opening in the foundation; and a second portion coupled to said first C-shaped portion for engaging the C-shaped housing.

7. The bracket according to claim 6, further including bolt means adapted to be inserted into a threaded hole in the first C-shaped portion of the bracket for forcing said second portion to engage the C-shaped housing.

8. The bracket according to claim 6, wherein the end of the first C-shaped portion disposed under the foundation has a relatively sharp point for penetrating the earth under the foundation.

9. The bracket according to claim 6, further including a cross piece coupled to the first C-shaped portion and extending toward an opposite side of the opening for engaging a cross piece of a second bracket, wherein said cross pieces maintain said bracket and said second brackets to be substantially opposite one another.

10. A method for securing a C-shaped housing to a foundation, said C-shaped housing having a transformer mounted thereon and coupled to underground power cables by way of an opening in the foundation, said method comprising the steps of:

attaching the C-shaped housing to the foundation with a bracket having a first C-shaped portion for engaging the side of the opening in the foundation and a second portion coupled to the first C-shaped portion for engaging the C-shaped housing; and forcing said second portion of the bracket to engage the C-shaped housing with bolt means inserted into a threaded hole in the first C-shaped portion of the bracket.

* * * * *